United States Patent [19]

Van Den Berg et al.

[11] Patent Number: 5,120,560

[45] Date of Patent: Jun. 9, 1992

[54] DEVICE FOR ROLLING DOUGH

[75] Inventors: Theodoor H. F. Van Den Berg, Oirschot; Mathijs Steeghs, Panningen, both of Netherlands

[73] Assignee: Werner & Pfleiderer-Haton B.V., Panningen, Netherlands

[21] Appl. No.: 504,622

[22] Filed: Apr. 4, 1990

[30] Foreign Application Priority Data

Apr. 10, 1989 [NL] Netherlands ............... 8900892

[51] Int. Cl.⁵ ............... A21C 3/02; B29C 43/46; B29C 43/58
[52] U.S. Cl. ............... 426/502; 264/40.5; 264/175; 425/141; 425/149; 425/363; 425/367
[58] Field of Search ............ 264/175, 40.5; 425/363, 425/367, 149; 72/20; 426/502

[56] References Cited

U.S. PATENT DOCUMENTS

| | | | |
|---|---|---|---|
| 1,650,758 | 11/1927 | Kukla. | |
| 2,669,948 | 2/1954 | Naylor | 107/12 |
| 2,971,218 | 2/1961 | Bierer | 264/175 |
| 2,983,020 | 5/1961 | Fouillet | 425/363 |
| 3,414,641 | 12/1964 | Miller | 264/175 |
| 3,885,465 | 5/1975 | Bergendahl | 72/20 |
| 3,901,635 | 8/1978 | Greenberger | 425/149 |
| 3,993,424 | 11/1976 | Pawelczyk et al. | 425/363 |
| 4,110,387 | 8/1978 | Wöckener et al. | 425/149 |
| 4,255,106 | 3/1981 | Anetsberger et al. | 425/363 |
| 4,348,166 | 9/1982 | Fowler | 425/363 |
| 4,380,954 | 4/1983 | Edele | 72/20 |
| 4,398,877 | 8/1983 | Taylor | 425/363 |
| 4,633,774 | 1/1987 | Kuosa et al. | 72/20 |
| 4,744,936 | 5/1988 | Bittner | 264/175 |
| 4,810,179 | 3/1989 | Cavanaugh | 425/149 |

FOREIGN PATENT DOCUMENTS 1096207 6/1955 France.
1098598 6/1984 U.S.S.R. ............... 72/20

Primary Examiner—Willard Hoag
Attorney, Agent, or Firm—Bacon & Thomas

[57] ABSTRACT

A device for flat-rolling a ball of dough to obtain a sheet of dough which has substantially straight front and rear edges. The device includes a framework for rotatably supporting a pair of rolls through which the ball of dough is passed, the rolls being supported such that they may move towards and away from each other, a biasing means being present to press the rolls towards each other, the biasing means being including at least one pressurized fluid cylinder to which pressurized fluid is supplied in such a way that in case of varying resistance of the dough a virtually constant opposing force is exerted onto said dough.

11 Claims, 1 Drawing Sheet

DEVICE FOR ROLLING DOUGH

BACKGROUND OF THE INVENTION

The invention relates to a device for flat-rolling a ball of dough for obtaining a sheet of dough which then can be rolled up, said device comprising a framework for rotatably supporting at least one pair of rolls for passing said ball of dough between these, said rolls being supported such that they may move towards and away from each other, a biasing means being present to press the rolls towards each other.

Such devices are used on a large scale and serve to remove gases out of the ball of dough as far as this is possible, either to break big gas bubbles or to divide these in a number of smaller gas bubbles without this having a disadvantageous effect on the elasticity of the dough. In this way a regular fine pore-structure in the baked finished article can be obtained. Rolling the ball of dough also serves for bringing the mass of dough in the desired shape so that this can be brought into a baking tin to be baked.

When the two rolls are positioned at a fixed distance from each other the ball of dough will be rolled to a sheet with a nearly equal thickness over its whole length, with a semi-circle front end and a semi-circle rear end.

When such a sheet of dough is rolled up a coarse irregular structure will arise in the baked finished product by the thick end.

In view of this in case of a known device the rolls are pressed towards each other by means of draw springs or compression springs as indicated above. Then the ball of dough is flat-rolled to a sheet of dough which at the ends runs out thinner, which is having a substantially straight front edge and a long pointed rear end.

This is caused because by using the springs the rolls may nearly engage each other so that the opening can be nearly null, by which the ariving ball of dough needs a higher resistance than when the rolls are positioned at a fixed distance from each other. Because of this the dough will be spread more and will form a straight front edge.

Because the spring force is continuously exerted on the rolls, the rolls will follow directly each reduction in dough thickness so that the latest small amount of dough will be rolled to a thin long point.

The latter results in a long spiral-shaped slot when the sheet of dough is rolled up, said slot extending over nearly the whole circumference of the sheet which is rolled up, which is clearly visible in the baked finished product and defaces the bread. This effect is further enhanced by the non-linear force of a spring.

Now the object of the invention is to remove these disadvantages and to provide a device by which it is possible to roll flat a ball of dough to a sheet which runs out thinner at the front and rear end, these ends being substantially straight across. The straight across ends in particular are considered as important.

BRIEF SUMMARY OF THE INVENTION

According to the invention straight across ends is obtained by using biasing means for the rolls comprising at least one pressurized fluid cylinder to which pressurized fluid is supplied in such a way that in spite of varying resistance of the dough a virtually constant opposing force is exerted onto the dough.

When applying such a pressurized fluid cylinder the rolls initially may engage each other with a fixed (i.e., constant) pressure. By this the arriving ball of dough will spread itself and will form a substantially straight front edge in the same way as occurs when draw springs or compression springs are used.

When now, however, the ball of dough is substantially rolled flat and so that less dough approaches the rolls, the pressurized fluid cylinder is enabled to react somewhat retarded such as by the internal friction between the piston and cylinder. Accordingly the rolls will not be pressed at once towards each other but this will take place with some delay. This delay should be sufficient so that the rear end of the sheet of dough is not rolled flat into a point. Thus the end edge of the sheet of dough will substantially extend parallel to the front edge of it and to the center lines of the rolls.

In accordance with the invention, the apparatus will use an automatic pressure regulating member for supplying pressurized fluid to the cylinder.

To make the device suitable for different types of dough the pressure with which the pressurized fluid is supplied to the cylinder may be adjustable.

As well as in case of the known device an adjusting means may be present by which it is possible to adjust the nip of the rolls at a variable pre-opening and at a variable end opening as well.

Although, as already said, often use can be made between the piston and the internal friction of the cylinder, also use can be made of an air cylinder having an oversized piston in a cylinder. By this greater friction creating a greater delay of the movement of the piston can be obtained.

Also the possibility exists to apply a means for exerting a braking force on the piston rod and this braking force could be adjustable.

The invention is further described by means of an embodiment, shown in the drawing.

BRIEF DESCRIPTION OF THE DRAWINGS

With reference to the appended drawings

DETAILED DESCRIPTION OF PREFERRED EMBODIMENTS

Figure 2:
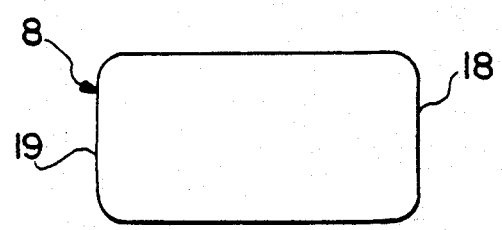
FIG. 2 is a plan view of a sheet of dough obtained by means of the device according to the invention.
Figure 1:
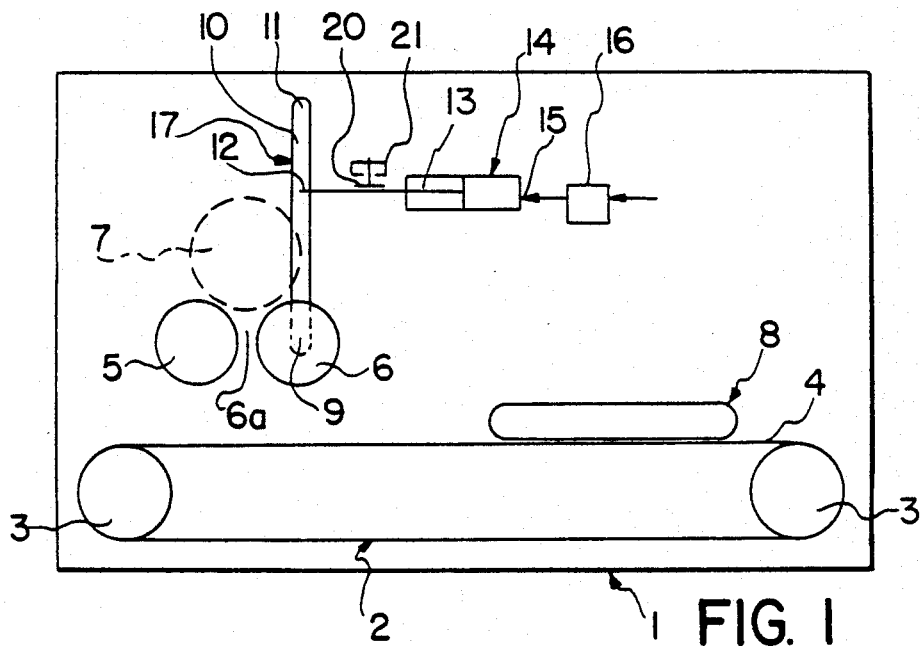
FIG. 1 schematically illustrates a side elevation view of a device according to the invention.

The device which is schematically shown in FIG. 1 comprises a framework 1, serving for supporting a conveyor 2, comprising two end rolls 3 and a conveyor belt 4. At least one of the end rolls 3 is driven.

Above the conveyor 2 rolls 5 and 6 are providing and forming a nip 6a through which a ball 7 of dough is fed to be flat rolled to the sheet 8 of dough.

The center line of the roll 5 is positioned at a fixed place in respect of the framework 1 but the shaft 9 of the roll 6 is supported by a bridge 10 which by means of the shaft 11 is pivotably supported by the framework 1. The piston rod 13 of the pressurized fluid cylinder 14 is connected to the bridge 10 at 12. The pressurized fluid cylinder 14 is, in a way not shown, connected to the framework 1. By means of the connection 15 pressurized fluid is supplied to the cylinder from an automatical pressure-regulating member 16. This pressurized fluid may have an adjustable pressure and the pressure regulator maintains a constant pressure supplied to actuator 14 to provide a constant force exerted onto the dough during rolling of the dough.

In particular use will be made of pressurized air because this is available in most industries.

To maintain the rolls 5 and 6 at a given minimal distance, if this is desired, the gap between framework 1 can be provided with an adjustable stop 17 cooperating with the bridge 10.

As a ball 7 of dough is being rolled flat, the roll 6 will be displaced away somewhat against the force of the pressurized fluid cylinder 14, so that the finished sheet 8 of dough will have a straight front edge 18. When the ball 7 of dough is nearly totally rolled flat, the roll 6 will rest in the position in which it was during the rolling of the ball 7 of dough during a sufficient long period by the retarded or delayed moving back of the piston rod 13. By this the sheet 8 of dough also will have a substantially straight rear edge 19.

The retarded outward movement of the piston rod 13 out of the cylinder 14 can also be obtained by applying a brake shoe 20 near the piston rod 13. This brake shoe can be supported by the part 21 of the framework 1 and the pressure with which the brake shoe 20 engages the piston rod 13 can be adjustable in a way not illustrated.

It will be obvious that only a possible embodiment of a device according to the invention is shown in the drawing and is described above and that many modifications can be applied without departing from the inventive concept.

We claim:

1. Apparatus for flat rolling a ball of dough so as to obtain a generally rectangular sheet of dough comprising:
    a framework;
    at least one pair of rolls forming a nip mounted on the framework so that they move towards and away from each other to vary the nip, said rolls arranged to receive a ball of dough at the input side of the nip;
    biasing means for urging the rolls towards each other, said biasing means comprising a pressurized fluid cylinder and fluid pressure supply means for supplying pressurized fluid to the cylinder, said fluid pressure supply means comprising means for maintaining the force applied by said cylinder constant; and
    means separate from the rollers for receiving the sheet of dough downstream of the nip and moving same away from the rollers.

2. Apparatus as claimed in claim 1, wherein said fluid pressure supply means includes a pressure regulator device arranged to maintain a constant pressure level in said cylinder during rolling of a ball of material.

3. Apparatus as claimed in claim 2, wherein said pressure regulator device is arranged to vary said pressure level.

4. Apparatus as claimed in claim 1, said cylinder including a fixed member and a relatively movable element for transmitting force, and including means for delaying movement of the movable element relative to the fixed member in response to material rolling and pressurized fluid forces acting thereon.

5. Apparatus as claimed in claim 4, said movement delaying means including a friction brake.

6. Apparatus as claimed in claim 5, wherein said friction brake is adjustable to vary the movement delaying effect.

7. A method for flat rolling a ball of dough to produce a dough sheet having generally straight ends and sides arranged in generally rectangular form comprising:
    feeding a ball of dough through a nip between a pair of rollers biased by a fluid pressure cylinder in a nip closing direction but moveable relative to each other against the biasing force to open the nip in response to force exerted on the rolls by the dough being rolled;
    controlling the biasing force exerted by the cylinder so that it remains constant while rolling the ball of dough.

8. The method according to claim 7, including controlling the biasing force by regulating the pressure of pressurized fluid supplied to the cylinder.

9. The method according to claim 7, including controlling the reaction movement of the rollers at least towards each other in response to dough rolling and biasing forces by delaying the reaction motion of the rollers in a manner tending to maintain a previous spacing at the nip of the rollers.

10. The method according to claim 9, including delaying the reaction movement of the rollers by frictionally resisting motion of the rollers towards each other.

11. The method according to claim 9, including delaying the reaction movement of the rollers by frictionally resisting the motion of the cylinder.

* * * * *